United States Patent
Kim et al.

(10) Patent No.: US 7,915,757 B2
(45) Date of Patent: Mar. 29, 2011

(54) MULTI-OUTPUT DC/DC CONVERTER

(75) Inventors: Jong Hae Kim, Gyunggi-do (KR); Sug Chin Sakong, Seoul (KR); Sung Soo Hong, Seoul (KR); Chung Wook Roh, Seoul (KR); Sang Kyoo Han, Daejeon (KR); Jong Sun Kim, Gyunggi-do (KR); Dong Seong Oh, Incheon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 211 days.

(21) Appl. No.: 12/243,837

(22) Filed: Oct. 1, 2008

(65) Prior Publication Data

US 2009/0243388 A1    Oct. 1, 2009

(30) Foreign Application Priority Data

Apr. 1, 2008 (KR) ...................... 10-2008-00030384

(51) Int. Cl.
*H02J 3/12* (2006.01)
(52) U.S. Cl. ...................................................... 307/31
(58) Field of Classification Search ................... 307/31; 363/37, 97, 103, 56.11
See application file for complete search history.

(56) References Cited

U.S. PATENT DOCUMENTS

| 5,619,403 A | * | 4/1997 | Ishikawa et al. ........... 363/21.06 |
| 5,736,842 A | * | 4/1998 | Jovanovic ..................... 323/222 |
| 6,829,151 B2 | | 12/2004 | Elferich et al. |
| 7,672,149 B2 | * | 3/2010 | Falk ............................... 363/98 |

FOREIGN PATENT DOCUMENTS

| JP | 407031137 A | * | 1/1995 |
| JP | 2006-101639 A | | 4/2006 |

OTHER PUBLICATIONS

Yilei Gu et al., "A Simple Structure of LLC Resonant DC-DC Converter for Multi-output Applications", Proc. of IEEE Applied Power Electronics Conference and Exposition, Mar. 2005, pp. 1485-1490.
K. Kobayashi et al., "Two Types of Control in the Current Mode Resonant Converter", Telecommunications Energy Conference, Nov. 1991, INTELEC '91., 13th International, pp. 345-353.

* cited by examiner

*Primary Examiner* — Albert W Paladini
(74) *Attorney, Agent, or Firm* — Lowe, Hauptman, Ham & Berner, LLP

(57) ABSTRACT

Disclosed is a multi-output DC/DC converter controlling power-conversion switching in synchronization with a frequency of one output voltage among multiple output voltages in an LLC resonant DC/DC converter. The multi-output DC/DC converter includes a power conversion circuit performing alternate switching on an input DC voltage to output multiple DC voltages including a first DC voltage and a second DC voltage each having a preset voltage level, and a control circuit controlling the alternate switching of the power conversion circuit in synchronization with a preset resonant frequency.

8 Claims, 5 Drawing Sheets

MULTI-OUTPUT DC/DC CONVERTER

CROSS-REFERENCE TO RELATED APPLICATIONS

This application claims the priority of Korean Patent Application No. 2008-30384 filed on Apr. 1, 2008, in the Korean Intellectual Property Office, the disclosure of which is incorporated herein by reference.

BACKGROUND OF THE INVENTION

1. Field of the Invention

The present invention relates to a multi-output DC/DC converter, and more particularly, to a multi-output DC/DC converter capable of controlling power-conversion switching in synchronization with a frequency of one output voltage among multiple output voltages in an LLC resonant DC/DC converter.

2. Description of the Related Art

Power supplies, particularly, DC/DC converters have been commonly used for information devices such as personal computers, and home electronic appliances such as air-conditioners and audio-visual devices.

The DC/DC converter may provide multiple output voltages according to an electronic product to which the DC/DC converter is applied.

A general multi-output DC/DC converter converts an input DC voltage to an AC voltage through a single transformer, and rectifies the converted AC voltage to output multiple DC voltages. However, if a voltage level of one DC voltage among multiple DC voltages is changed by a single transformer, it affects to other DC voltages, causing the general multi-output DC/DC converter to fail to maintain cross-regulation. In order to maintain the cross-regulation, a multi-output DC/DC converter employs a buck chopper circuit at an output terminal.

FIG. 1 is a diagram illustrating a configuration of a related art multi-output DC/DC converter.

Referring to FIG. 1, in the related art multi-output DC/DC converter, a switching unit 11 converts an input DC voltage Vin into an AC voltage by alternate switching, and sends the converted AC voltage to a primary winding L1 of a single transformer 12.

First and second secondary windings L2 and L3 respectively send AC voltages to first and second rectification units 13 and 14 depending on the preset ratio of the number of turns of the primary winding L1 to the corresponding secondary winding. The first and second rectification units 13 and 14 rectify the AC voltages to output DC voltages.

In detail, the first rectification unit 13 outputs a first DC voltage Vs, and the second rectification unit 14 sends a DC voltage to a buck chopper circuit 15. The buck chopper circuit 15 switches the DC voltage from the second rectification unit 14 under the control of a controller 15a, and outputs a second DC voltage Va having a lower voltage level than a voltage level of the DC voltage.

The buck chopper circuit 15 includes a switch S, a freewheeling diode D, and a filter L.

However, the related art multi-output DC/DC converter has a limitation of low power conversion efficiency because it performs primary voltage conversion and then re-converts the voltage through the buck chopper circuit 15. Also, the buck chopper circuit 15 causes an increase in number of components, thereby increasing a manufacturing cost.

SUMMARY OF THE INVENTION

An aspect of the present invention provides a multi-output DC/DC converter capable of controlling power-conversion switching in synchronization with a frequency of one output voltage among multiple output voltages without using a buck chopper circuit, which is constructed at an output terminal, in an LLC resonance DC/DC converter.

According to an aspect of the present invention, there is provided a multi-output direct-current (DC)/DC converter including: a power conversion circuit performing alternate switching on an input DC voltage to output multiple DC voltages including a first DC voltage and a second DC voltage each having a preset voltage level; and a control circuit controlling the alternate switching of the power conversion circuit in synchronization with a preset resonant frequency.

The control circuit may include: a frequency control unit controlling the resonant frequency according to a result of comparing a voltage level of a preset first reference voltage with a voltage level of the first DC voltage; a saw-tooth wave generation unit generating a saw-tooth wave according to the resonant frequency from the frequency control unit; a duty control unit comparing the saw-tooth wave from the saw-tooth wave generation unit with a difference between a voltage level of a preset second reference voltage with a voltage level of the second DC voltage to control a switching duty of the power conversion circuit; and a switching control unit providing first and second switching signals for controlling the alternate switching of the power conversion circuit according to the switching duty controlled by the duty control unit.

The frequency control unit may include: a first error amplifier comparing the voltage level of the preset first reference voltage with the voltage level of the first DC voltage to amplify a result of the comparison according to a preset amplification rate; a first resistor setting the amplification rate of the first error amplifier according to a preset resistance value; and a frequency modulator setting the resonant frequency according to the result of the comparison amplified by the first error amplifier.

The duty control unit may include: a second error amplifier comparing the voltage level of the preset second reference voltage with the voltage level of the second DC voltage to amplify a result of the comparison according to a preset amplification rate; a second resistor setting the amplification rate of the second error amplifier according to a preset resistance value; a comparator comparing the saw-tooth wave from the saw-tooth generation unit with the result of the comparison amplified by the second error amplifier; and a duty modulator setting a switching duty of the power conversion circuit according to the result of the comparison from the comparator.

The power conversion circuit may include: a switching unit including first and second switches performing alternate switching under the control of the control unit; first and second conversion units each converting a voltage switched from the switching unit into an AC voltage having a voltage level determined according to a preset ratio of the number of turns in primary and secondary windings; and first and second rectification units rectifying AC voltages from the first and second conversion units to output the first DC voltage and the second DC voltage, respectively.

The first conversion unit may be an inductor-inductor-capacitor (LLC) resonant conversion unit including a resonant capacitor and a resonant inductor connected in series to a power input terminal of the first switch, and a magnetizing inductor connected in parallel to the first switch. The second conversion unit may be an LLC resonant conversion unit including a resonant capacitor and a resonant inductor connected in series to a power input terminal of the second switch, and a magnetizing inductor connected in parallel to the second switch.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
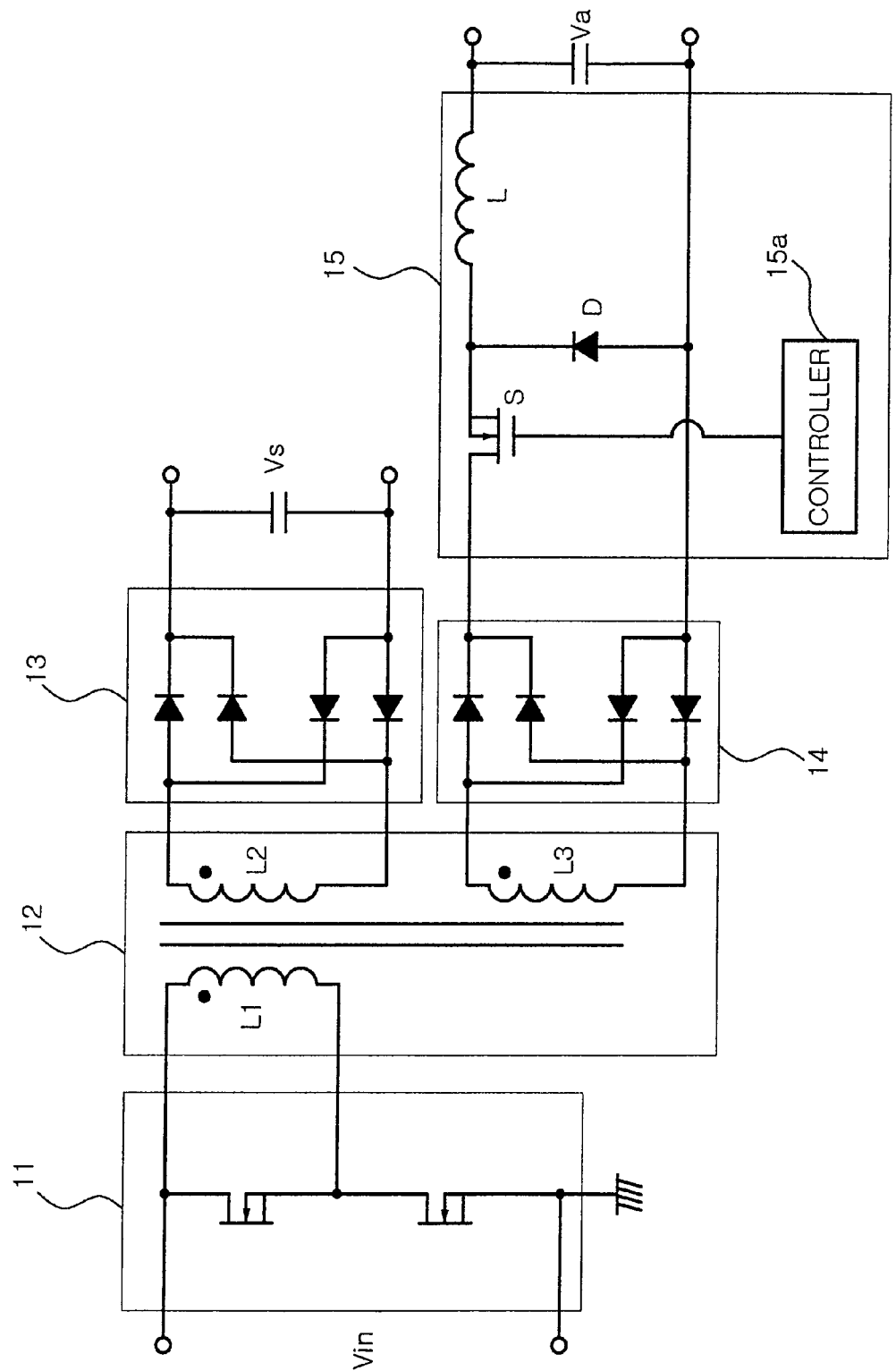
FIG. 1 is a diagram illustrating a configuration of a related art multi-output DC/DC converter.
Figure 2:
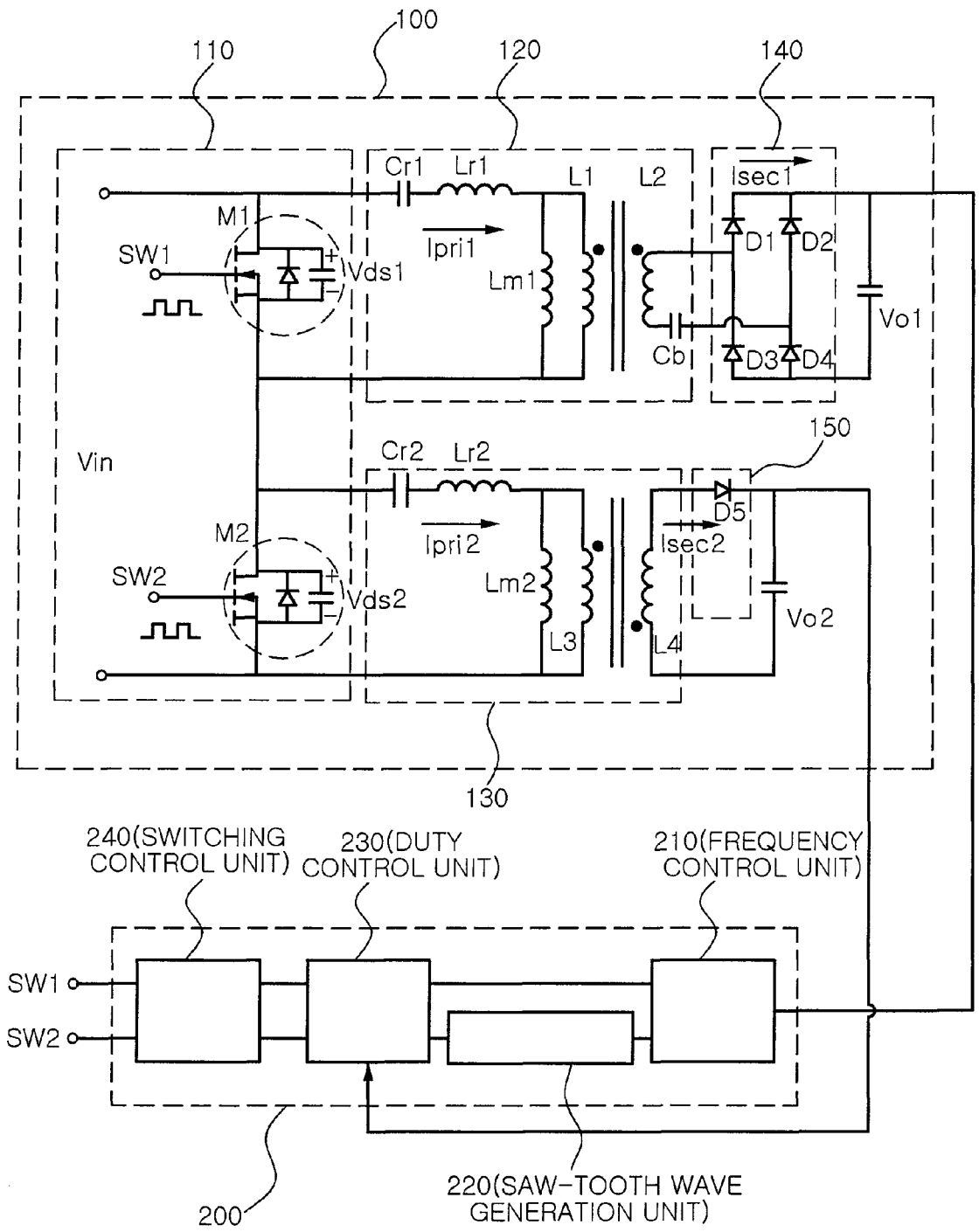
FIG. 2 is a diagram illustrating a configuration of a multi-output DC/DC converter according to an exemplary embodiment of the present invention.

FIG. 2 is a diagram illustrating a configuration of a multi-output DC/DC converter according to an exemplary embodiment of the present invention.

Referring to FIG. 2, a multi-output DC/DC converter according to an exemplary embodiment of the present invention includes a power conversion circuit 100, and a control circuit 200. The power conversion circuit 100 alternately switches on and off an input DC voltage (Vin) to output multiple DC voltages including first and second DC voltages (Vo1/Vo2). The control circuit 200 controls switching of the power conversion circuit 100.

The power conversion circuit 100 may include a switching unit 110, first and second conversion units 120 and 130, and first and second rectification units 140 and 150.

The switching unit 110 may include first and second switches M1 and M2. The first and second switches M1 and M2 are electrically connected together in series and electrically connected in parallel to an input DC power terminal. The first and second switches M1 and M2 perform alternate switching in response to respective switching signals SW1 and SW2 from the control circuit 200. AC voltages (Vds1/Vds2) switched from the switching unit 110 are sent to the first and second conversion units 120 and 130.

The first conversion unit 120 may be an inductor-inductor-capacitor (LLC) resonant conversion unit including a first resonant capacitor Cr1 and a first resonant inductor Lr1 connected together in series, and a first magnetizing inductor Lm1 connected in parallel to the first switch M1. The second conversion unit 130 may also be an LLC resonant conversion unit including a second resonant capacitor Cr2 and a second resonant inductor Lr2 connected together in series, and a second magnetizing inductor Lm2 connected in parallel to the second switch M2. The first conversion unit 120 may further include a transformer including a primary winding L1 and a secondary winding L2 having a preset ratio of the number of turns of the primary winding L1 to the secondary winding L2.

The second conversion unit 130 may also include a transformer including a primary winding L3 and a secondary winding L4 having a preset ratio of the number of turns in the primary and secondary windings L3 and L4. Each of the first and second magnetizing inductors Lm1 and Lm2 may be formed only as leakage inductance of corresponding one of the transformers.

The AC voltages switched from the switching unit 110 are converted into AC voltages having voltage levels according to the preset ratio of the number of turns of each of the first and second conversion units 120 and 130. The converted AC voltages are sent to the first and second rectification units 140 and 150.

The first and second rectification units 140 and 150 rectify the AC voltages from the first and second conversion units 120 and 130, and output first and second DC voltages Vo1 and Vo2, respectively. A rectification device of each of the first and second rectification units 140 and 150 may include at least one diode D5 for half-wave rectification, or a bridge diode including a plurality of diodes D1 to D4 for full-wave rectification. The respective first and second DC voltages Vo1 and Vo2 from the first and second rectification units 140 and 150 are sent to the control circuit 200.

Figure 5:
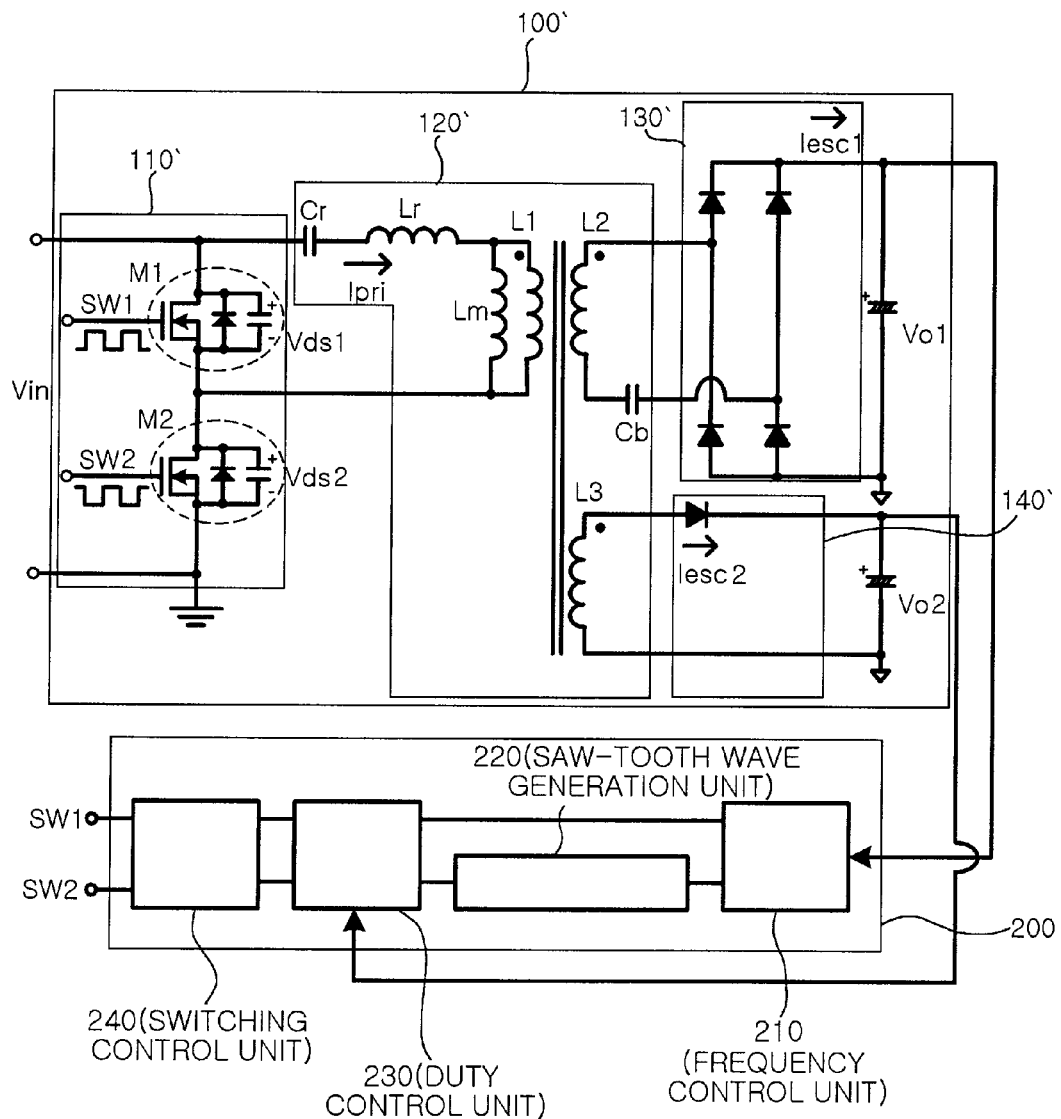
FIG. 5 is a diagram illustrating a configuration of a multi-output DC/DC converter according to another exemplary embodiment of the present invention.

A power conversion circuit employed in a multi-output DC/DC converter according to the present invention may include the first and second conversion units 120 and 130 each including one transformer, but may include a conversion unit including one transformer to reduce a circuit area (see 120' of FIG. 5).

FIG. 5 is a diagram illustrating a configuration of a multi-output DC/DC converter according to another exemplary embodiment of the present invention.

Referring to FIG. 5, a power conversion circuit 100' of the multi-output DC/DC converter may include a power conversion circuit 100' including a switching unit 110', a conversion unit 120', and first and second rectification units 130' and 140'. The switching unit 110' and the first and second rectification units 130' and 140' illustrated in FIG. 5 have identical electrical functions to those of the switching unit 110 and the first and second rectification units 140 and 150 illustrated in FIG. 2. Therefore, the description thereof will be omitted.

The conversion unit 120' of the multi-output DC/DC converter of FIG. 5 includes one transformer. Thus, the transformer includes one primary winding L1, and first and second secondary windings L2 and L3. The first secondary winding L2 sends the first rectification unit 130' an AC voltage converted according to the preset ratio of the number of turns of the primary winding L1 to the first secondary winding L2. The second secondary windings L3 sends the second rectification units 140' an AC voltage converted according to the ratio of the number of turns of the primary winding L1 to the second secondary winding L3. The conversion unit 120' may also be an LLC resonant conversion unit including a resonant capacitor Cr and a resonant inductor Lr connected together in series, and a magnetizing inductor Lm connected in parallel to the first switch M1. The magnetizing inductor Lm may be formed only as leakage inductance of the transformer.

The control circuit 200 includes a frequency control unit 210 receiving the first DC voltage Vo1, a saw-tooth wave generation unit 220, a duty control unit 230 receiving the second DC voltage Vo2, and a switching control unit 240. A detail configuration of the control circuit 200 will now be described with reference to FIG. 3 in detail.

Figure 3:
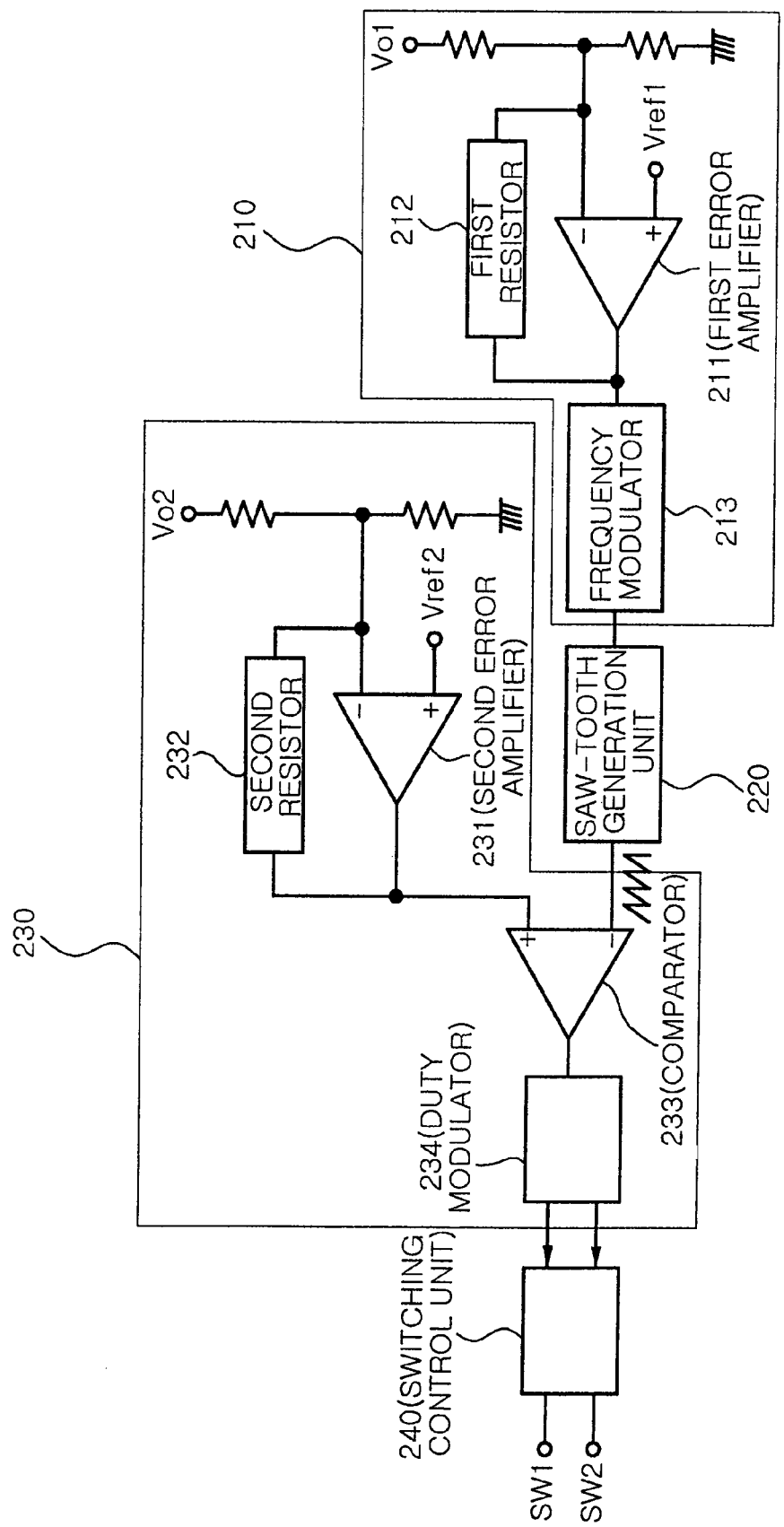
FIG. 3 is a diagram illustrating a configuration of a control circuit employed in a multi-output DC/DC converter, according to an exemplary embodiment of the present invention.

FIG. 3 is a diagram illustrating a configuration of a control circuit employed in a multi-output DC/DC converter, according to an exemplary embodiment of the present invention.

FIG. 3 shows the detailed configuration of the control circuit 200 employed in the multi-output DC/DC converter, according to an exemplary embodiment of the present invention.

The frequency control unit 210 of the control circuit 200 includes a first error amplifier 211 amplifying a difference between a voltage level of a first DC voltage Vo1 and a voltage level of a preset first reference voltage Vref1, a first resistor 212 setting a rate of error amplification of the first error amplifier 211 according to a preset resistance value, and a frequency modulator 213 setting a frequency according to a comparison result from the first error amplifier 211. A frequency signal from the frequency modulator 213 is sent to the saw-tooth wave generation unit 220.

The saw-tooth wave generation unit 220 generates a saw-tooth wave synchronized with a frequency signal from the frequency modulator 213. The saw-tooth wave is sent to the duty control unit 230.

The duty control unit 230 includes a second error amplifier 231, a second resistor 232, a comparator 233, and a duty modulator 234. The second error amplifier 231 amplifies a difference between a voltage level of a second DC voltage Vo2 and a voltage level of a preset second reference voltage Vref2. The second resistor 232 sets a rate of error amplification of the second error amplifier 231 according to a preset resistance value. The comparator 233 compares a voltage level of the saw-tooth wave from the saw-tooth wave generation unit 220 with a voltage level of a comparison result from the second error amplifier 231. The duty modulator 234 sets a switching duty according to a comparison result from the comparator 223. A duty signal from the duty modulator 234 is sent to the switching control unit 240.

The switching control unit 240 sends first and second switching signals SW1 and SW2 controlling switching of the first and second switches M1 and M2 according to the duty signal from the duty modulator 234.

Figure 4:
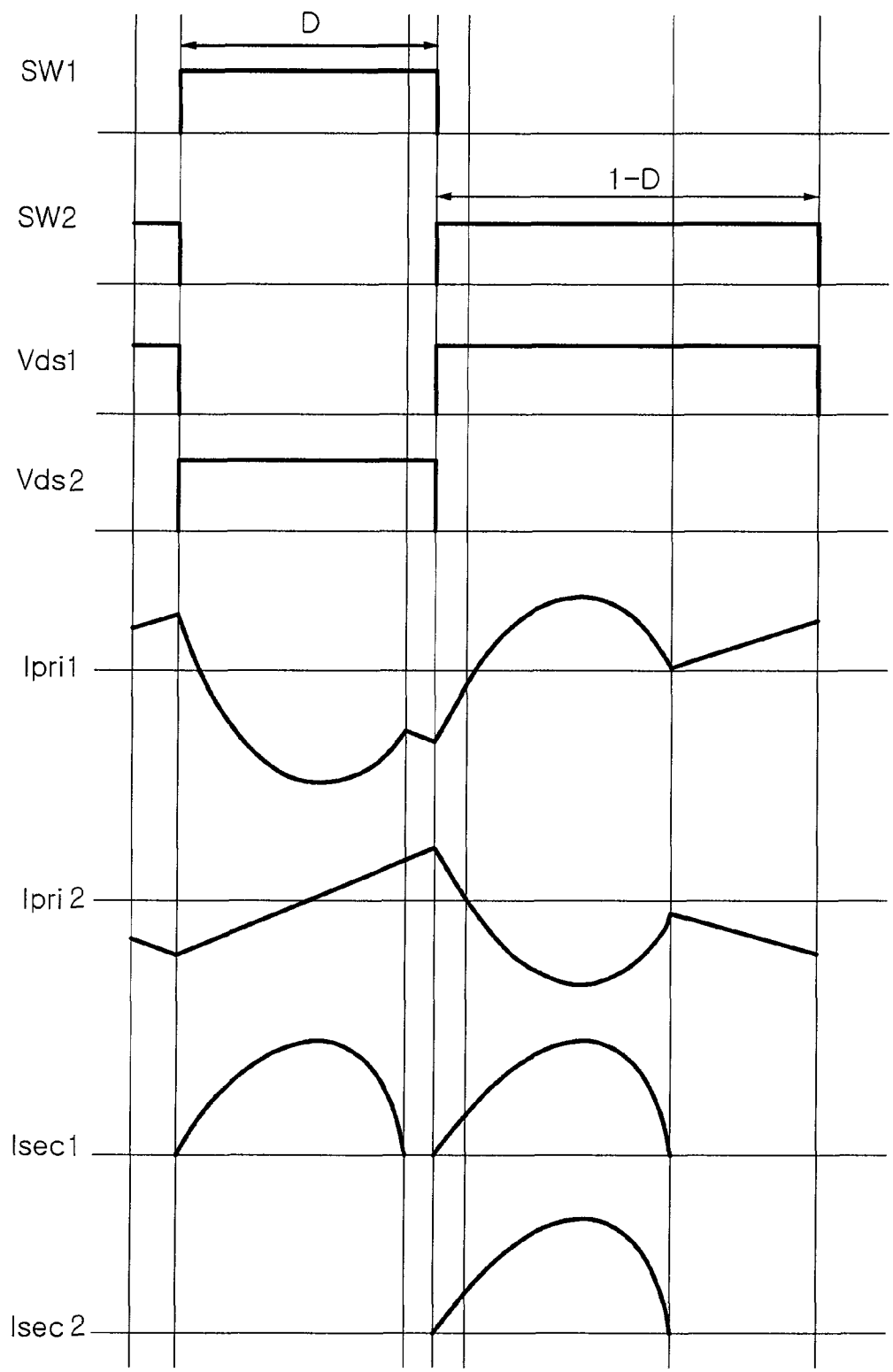
FIG. 4 is a waveform diagram illustrating the operation of a multi-output DC/DC converter according to the exemplary embodiment of the present invention.

FIG. 4 is a waveform diagram illustrating the operation of a multi-output DC/DC converter of FIG. 2.

Referring to FIGS. 2 through 4, the detailed operation of the multi-output DC/DC converter according to the exemplary embodiment of the present invention will now be described.

The first and second switches M1 and M2 are alternately switched on and off under the control of the control circuit 200, and thus are respectively operated at duty cycles of D and 1-D. Thus, when the first and second switches M1 and M2 are in an OFF state, voltages Vds1 and Vds2 are respectively applied to the first and second switches M1 and M2.

A charging voltage of the first resonant capacitor Cr1 is adjusted through the alternate switching of the first and second switches M1 and M2, thereby controlling a voltage being applied to the primary winding L1 of the first conversion unit 120. Thus, a first DC voltage Vo1 is formed through the secondary winding L2 of the first conversion unit 120 and the diodes D1 and D4 or D2 and D3 of the first rectification unit 140.

The first DC voltage Vo1 is precisely formed through the frequency control unit 210 modulating a switching frequency.

The charging voltage of the second resonant capacitor Cr2 is adjusted through the alternate ON/OFF switching of the first and second switches M1 and M2, thereby controlling a voltage being applied to the primary winding L3 of the second conversion unit 130. Thus, a second DC voltage Vo2 is formed through the secondary winding L4 and the diode D5 of the second rectification unit 150.

The multi-output DC/DC converter according to the exemplary embodiment of the present invention includes the frequency control unit 210 controlling an output voltage based on the first DC voltage Vo1, and the duty control unit 230 controlling an output voltage based on the second DC voltage Vo2.

The duty control unit 230 performs pulse-width modulation in synchronization with a switching frequency of the frequency control unit 210 changed based on the first DC voltage Vo1.

In the frequency control unit 210 of the control circuit 200, the first error amplifier 211 compares a voltage level of a preset first reference voltage Vref1 with a voltage level of a first DC voltage Vo1 divided by a preset resistance value. Thereafter, the frequency modulator 213 of the first control unit 210 sends the saw-tooth wave generation unit 220 a frequency signal having a frequency being varied according to a comparison result from the first error amplifier 211.

The saw-tooth wave generation unit 220 forms a saw-tooth wave synchronized with the variable frequency of the frequency signal. In the duty control unit 230, the second error amplifier 231 compares a voltage level of a preset second reference voltage Vref2 with a voltage level of a second DC voltage Vo2. Thereafter, the comparator 233 of the duty control unit 230 compares the saw-tooth wave from the saw-tooth wave generation unit 220 with an error result from the second error amplifier 231. Then, the duty modulator 234 of the duty control unit 230 forms a duty signal and sends it to the switching control unit 240. The switching control unit 240 sends first and second switching signals SW1 and SW2 to the switching unit 110 according to the duty signal, thereby controlling switching of the first and second switches M1 and M2.

In more detail, a charging voltage of the first resonant capacitor Cr1 is adjusted through the alternate ON/OFF switching of the first and second switches M1 and M2 to control a voltage being applied to the primary winding L1 of the first conversion unit 120. Accordingly, the first DC voltage Vo1 is formed through the secondary winding L2 of the first conversion unit 120 and the diodes D1 and D4 or D2 and D3 of the first rectification unit 140.

If the voltage level of the first DC voltage Vo1 increases, a switching frequency is increased through the frequency control unit 210 modulating the switching frequency, thereby reducing the charging voltage of the first resonant capacitor Cr1. Accordingly, the voltage being applied to the primary winding L1 of the first conversion unit 120 is reduced, which causes a decrease in voltage formed at both ends of the secondary winding L2. Therefore, the increased voltage level of the first DC voltage Vo1 is reduced and maintained at a normal state.

The first rectification unit 140 may include a DC blocking capacitor Cb. The DC blocking capacitor Cb is used in order to prevent a resonant current generated at the first conversion unit 120 from passing through a path just for the diodes D1 and D4 or D2 and D3 of the first rectification unit 140 when asymmetry of a duty generated based on the second DC voltage Vo2 occurs When the voltage level of the second DC voltage Vo2 changes because of a change in load of the second DC voltage Vo2, a duty-ON cycle of a switch directly associated with the second DC voltage Vo2 is controlled. An operating duty D, which is directly associated with the second DC voltage Vo2 is applied to the first switch M1. If the voltage level of the second DC voltage Vo2 increases, the operating duty D is reduced because of the pulse-width modulation control. For this reason, the first DC voltage Vo1 is affected to change a gain curve, so that the voltage level of the first DC voltage Vo1 increases.

As the voltage level of the first DC voltage increases, the switching frequency increases because of the control of the frequency control unit 210. The increase in the switching frequency induces voltage drop of the second DC voltage Vo2. Accordingly, the first and second DC voltages Vo1 and Vo2 having desired voltage levels are obtained simultaneously.

The operation of the multi-output DC/DC converter according to the embodiment of FIG. 5 is the same as the operation illustrated in FIG. 4, except for a current Ipri2 flowing to the primary winding L3 of the second conversion unit 130. Thus, the description thereof will be omitted.

As described so far, frequency control and duty control synchronized with the frequency control can be performed simultaneously at the time of power conversion. Accordingly, a buck chopper circuit used in a related art multi-output DC/DC converter is unnecessary. Thus, power loss due to switching loss and conduction loss of the buck chopper circuit can be reduced. A manufacturing cost corresponding to the number of components of the buck chopper circuit can be saved.

When the multi-output DC/DC converter according to the embodiment of the present invention uses a single transformer as in the related art, the same circuit area and the same number of components are required as in the related art multi-output DC/DC converter. Also, when the multi-output DC/DC converter according to the embodiment of the present invention uses two transformers, the power can be handled separately by the two transformers whereas in the related art, the entire power is handled by a single transformer. Accordingly, miniaturization of each transformer can be achieved. In the case of the control circuit 200, the aforementioned functions thereof can be integrated into one integrated circuit (IC). Thus, the number of components and the manufacturing cost are prevented from increasing.

According to the present invention, the multi-output DC/DC converter according to the embodiments of the present invention does not use a buck chopper circuit to maintain cross regulation between multiple output voltages. Also, alternate switching for power conversion is controlled in synchronization with a first DC voltage among multiple output voltages, thereby increasing the efficiency of the power conversion. Also, the manufacturing costs can be saved by omitting the buck chopper circuit and thus reducing the number of components being used therein.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-output direct-current (DC)/DC converter comprising:
    a power conversion circuit configured to receive an input DC voltage, to convert the input voltage into at least one alternate-current (AC) signal according to a set of switching signals, to convert the at least one AC signal into multiple output DC voltages, and to output the multiple output DC voltages, the multiple output DC voltages including a first DC voltage and a second DC voltage; and
    a control circuit configured to generate the set of switching signals, the set of switching signals being pulse-width modulated signals having a frequency determined according to the first DC voltage and a duty ratio determined according to the second DC voltage.

2. The multi-output DC/DC converter of claim 1, wherein the control circuit comprises:
    a frequency control unit configured to generate a resonant signal having the frequency according to a result of comparing a voltage level of a preset first reference voltage with a voltage level of the first DC voltage;
    a saw-tooth wave generation unit coupled to the frequency control unit and configured to generate a saw-tooth wave according to the resonant signal from the frequency control unit;
    a duty control unit coupled to the saw-tooth wave generation unit and configured to generate a control signal having the duty ratio by comparing the saw-tooth wave from the saw-tooth wave generation unit with a difference between a voltage level of a preset second reference voltage with a voltage level of the second DC voltage; and
    a switching control unit coupled to the duty control unit and configured to generate the set of switching signals.

3. The multi-output DC/DC converter of claim 2, wherein the frequency control unit comprises:
    a first error amplifier for comparing the voltage level of the preset first reference voltage with the voltage level of the first DC voltage and configured to amplify a result of the comparison according to a preset amplification rate;
    a first resistor for setting the amplification rate of the first error amplifier according to a preset resistance value; and
    a frequency modulator for setting the frequency for the resonant signal according to the result of the comparison amplified by the first error amplifier.

4. The multi-output DC/DC converter of claim 2, wherein the duty control unit comprises:
    a second error amplifier for comparing the voltage level of the preset second reference voltage with the voltage level of the second DC voltage and configured to amplify a result of the comparison according to a preset amplification rate;
    a second resistor for setting the amplification rate of the second error amplifier according to a preset resistance value;
    a comparator for comparing the saw-tooth wave from the saw-tooth generation unit with the result of the comparison amplified by the second error amplifier; and
    a duty modulator for setting the duty ratio for the control signal according to the result of the comparison from the comparator.

5. The multi-output DC/DC converter of claim 2, wherein the power conversion circuit comprises:
    a switching unit including first and second switches for performing alternate switching to convert the input voltage into the at least one AC signal under the control of the control unit;
    a first conversion unit having a primary and a secondary windings, the first conversion unit being coupled to the switching unit and configured to convert a first one of the at least one AC signal into a first converted AC signal having a voltage level determined according to a preset ratio of the number of turns in the primary and secondary windings of the first conversion unit;
    a second conversion unit having a primary and a secondary windings, the second conversion unit being coupled to the switching unit and configured to convert a second one of the at least one AC signal into a second converted AC signal having a voltage level determined according to a preset ratio of the number of turns in the primary and secondary windings of the second conversion unit; and a first rectification units coupled to the first conversion unit and configured to rectify the first converted AC signal into the first DC voltage; and a second rectification units coupled to the second conversion unit and configured to rectify the second converted AC signal into the second DC voltage.

6. The multi-output DC/DC converter of claim 5, wherein the first conversion unit is an inductor-inductor-capacitor (LLC) resonant conversion unit including a resonant capacitor and a resonant inductor connected in series to a power input terminal of the first switch, and a magnetizing inductor connected in parallel to the first switch, and the second conversion unit is an LLC resonant conversion unit including a resonant capacitor and a resonant inductor connected in series to a power input terminal of the second switch, and a magnetizing inductor connected in parallel to the second switch.

7. A multi-output direct-current (DC)/DC converter comprising:

a means for receiving an input DC voltage and for outputting a first DC voltage and a second DC voltage according to a set of control signals; and a means for generating the set of control signals, the set of control signals being pulse-width modulated signals having a frequency determined according to the first DC voltage and a duty ratio determined according to the second DC voltage.

8. A method of converting an input direct-current (DC) voltage to a first DC voltage and a second DC voltage, comprising:

generating a first alternate-current (AC) signal and a second AC signal by alternatively switching the input DC voltage according to a set of switching signals;

converting the first AC signal to generate a first DC voltage;

converting the second AC signal to generate a second DC voltage;

generating a resonant signal having a frequency determined according to the first DC voltage;

generating a pulse-width modulated signal based on the resonant signal, the pulse-width modulated signal having a frequency determined according to the first DC voltage and a duty ratio determined according to the second DC voltage; and generating the set of switching signals based on the pulse-width modulated signal.

* * * * *